B. E. D. STAFFORD.
STAY BOLT.
APPLICATION FILED NOV. 8, 1909.
980,696.
Patented Jan. 3, 1911.
2 SHEETS—SHEET 1.
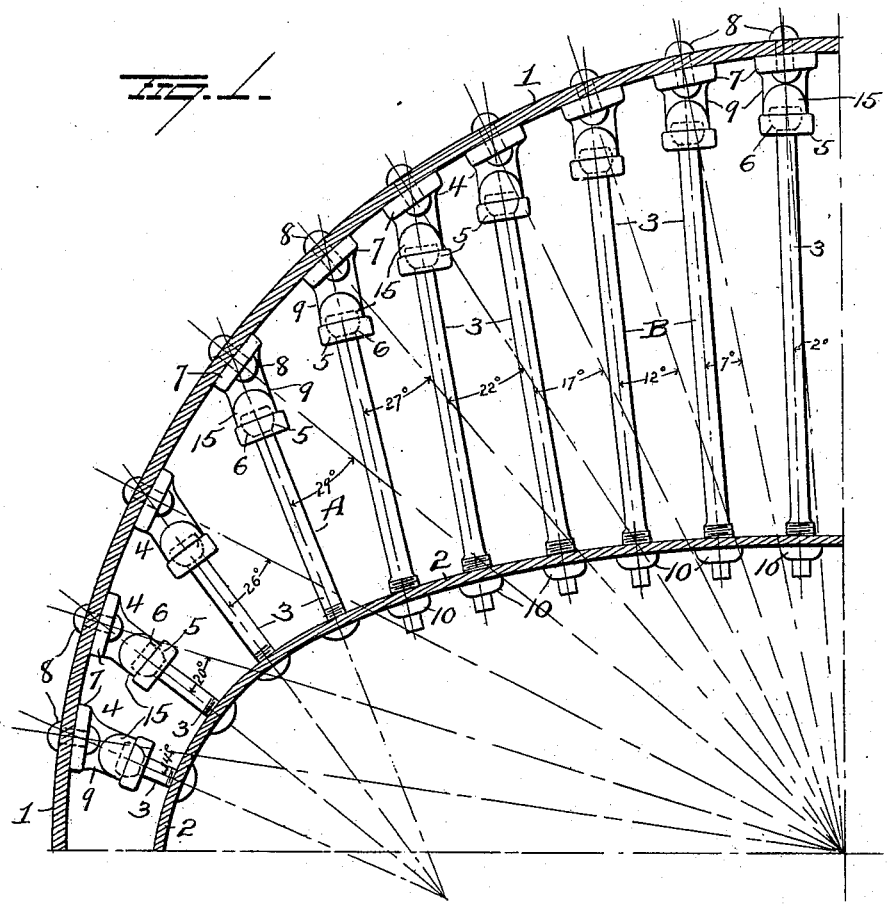
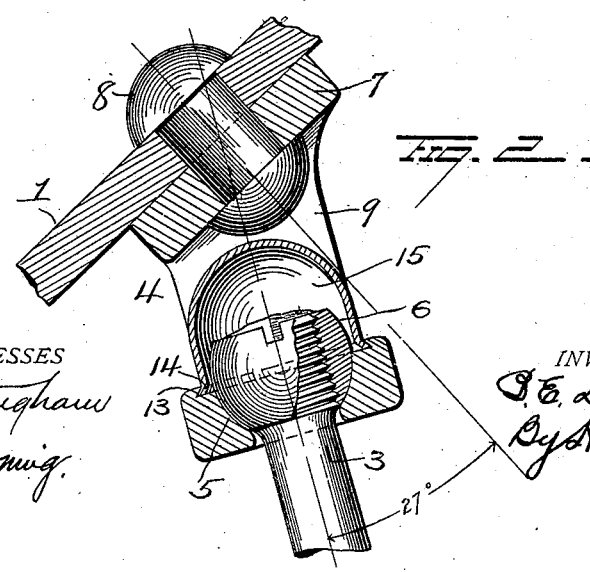
WITNESSES
INVENTOR

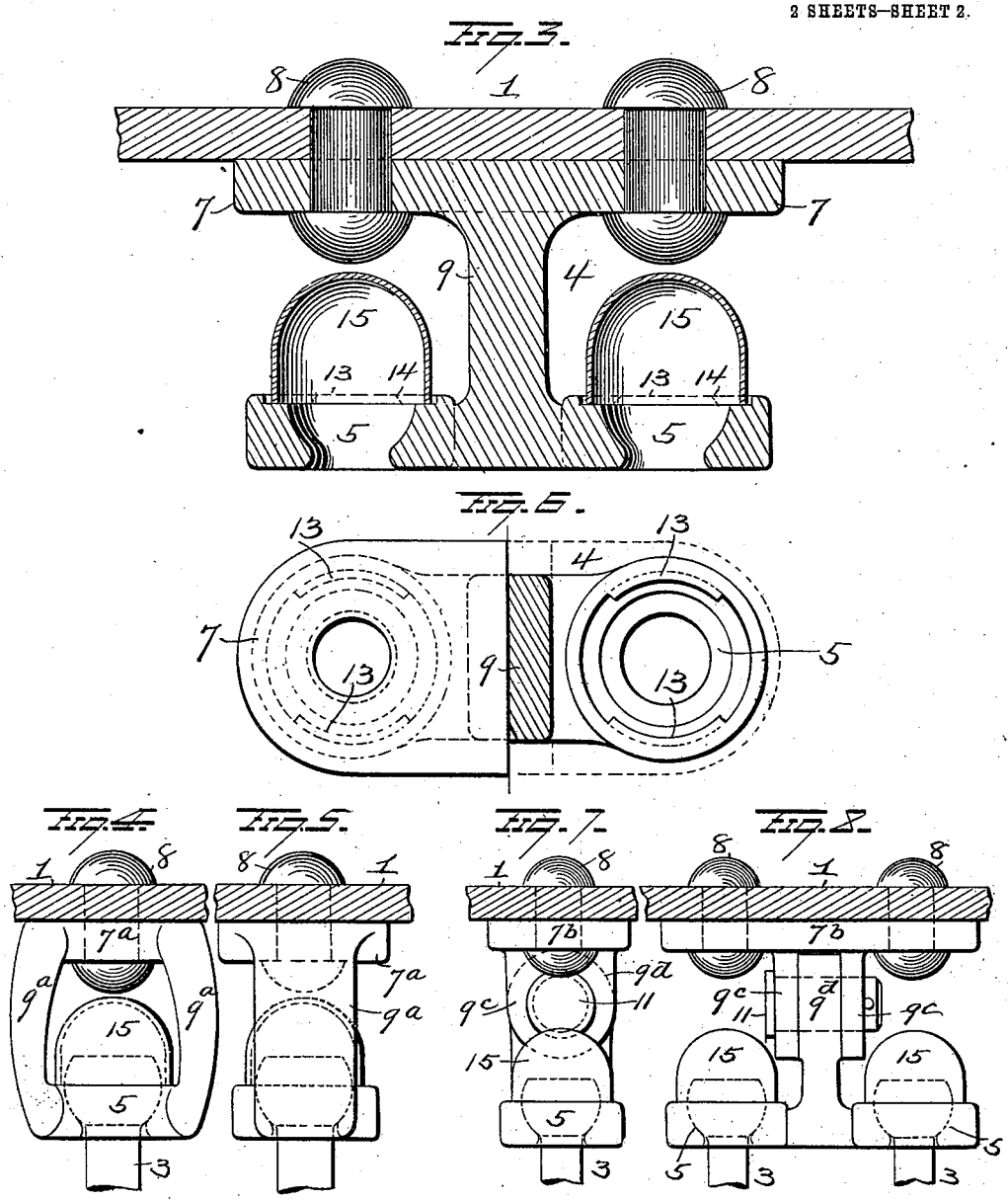

UNITED STATES PATENT OFFICE.

BENJAMIN E. D. STAFFORD, OF PITTSBURG, PENNSYLVANIA, ASSIGNOR TO FLANNERY BOLT COMPANY, OF PITTSBURG, PENNSYLVANIA.

STAY-BOLT.

980,696.  Specification of Letters Patent.  Patented Jan. 3, 1911.

Application filed November 8, 1909. Serial No. 526,899.

*To all whom it may concern:*

Be it known that I, BENJAMIN E. D. STAFFORD, of Pittsburg, in the county of Allegheny and State of Pennsylvania, have invented certain new and useful Improvements in Means for Securing Stay-Bolts to Boilers; and I do hereby declare the following to be a full, clear, and exact description of the invention, such as will enable others skilled in the art to which it appertains to make and use the same.

My invention relates to an improvement in means for securing stay bolts to boilers, and it consists in brackets riveted to the inner face of the roof sheet of the boiler, and provided with seats having openings for the passage of the bolts.

My invention further consists in sheet metal caps removably secured to the brackets and covering and protecting the heads of the bolts.

My invention further consists in the details of construction and combinations of parts as will be more fully described and pointed out in the claims.

In the accompanying drawings, Figure 1 is a view in section of a portion of a locomotive boiler showing my improved stay bolts therein, Fig. 2 is a view through a section of the roof sheet, one seat of the bracket and its cap and showing the bolt head partly in section and partly in elevation. Fig. 3 is a similar view through both seats of the bracket. Figs. 4 and 5 are views in elevation of a bracket having a single seat. Fig. 6 is a view in plan partly in section showing lips on the seats for locking the caps in place and Figs. 7 and 8 are views of a swinging bracket.

1 represents the roof sheet and 2 the crown sheet connected by the bolts 3. Riveted to the inner face of the roof sheet, are the brackets 4 each having two seats 5 for the heads 6 of the bolts 3. Each bracket is H-shape in side elevation, the base member 7 thereof being provided with rivet holes for its attachment by rivets 8 to the roof sheet 1 as shown in Fig. 3. The web 9 of the bracket is located intermediate the rivet holes, and the two seats 5 are formed integral with the web, the openings in said seats being in line with the rivets 8, which as before explained secure the brackets to the roof sheet. The base 7 of the bracket fits solidly and flatly against the inner face of the roof sheet, while the web thereof projects in a plane parallel with the long axis of the bolts connected thereto, as clearly shown in Fig. 2. The inclination of the base with relation to the web depends altogether on its location on the roof sheet, but in each instance the inclination is such that the web 9 will be in a plane parallel with the long axis of the bolt, and the seats 5 be maintained at right angles to said long axis. In some instances as at A, where the stay bolt is at an angle of about twenty nine degrees from a line at right angles to the outer face of the roof sheet, the inclination of the base 7 will be greater than at other points, say at bolts B, where the latter stand at an angle of about twelve degrees from a right angle. In all cases however, the long axis of the stay bolt, which is the line of stress of the bolt, passes through the center of the rivet. Each double bracket heretofore referred to, is therefore secured by two rivets, and each has two seats located on opposite sides of the web of the bracket as shown in Fig. 3, and each seat is rounded to receive the head of the bolt 3. This head may be integral with the bolt as shown in the Tate Patent No. 753,329 granted March 1st, 1904, or it may be a spherical nut as shown in Fig. 2. This nut is a sphere with flattened ends, the threaded bore extending from one flat end to the other. This head 6 of the bolt rests on the curved seat 5, and has a free rocking movement therein, the lower end of the seat being flared outwardly as shown in Fig. 2 to permit of such movement by the bolt. The lower end of the bolt may be secured to the crown sheet and then upset as shown at the left side of Fig. 1, or they may be provided with button head as shown at 10 in the same figure.

In the construction shown in Figs. 4 and 5, each bracket is designed to carry a single stay bolt, and each is composed of a base member $7^a$ and two webs $9^a$, the seat 5, being between and integral with the side members or webs $9^a$. In this construction, as in the double bracket, the single securing rivet is located immediately over the head of the stay bolt, so that the lines of stress pass through the centers of the rivets.

The construction shown in Figs. 7 and 8 is like that shown in Figs. 1, 2 and 3 except that it is made in two parts pivoted together, so as to permit the seats to accommodate themselves to the inclination of the stay bolts. In this latter construction the base member 7ᵇ is provided with depending parallel flanges 9ᶜ between which the flange or web 9ᵈ integral with the seats, rests and to which it is pivoted by the pin 11. As the seats can move to accommodate themselves to the inclination of the bolt, the bracket can be used in any position, and hence dispenses with the necessity of a series of brackets with base members located at different angles to the web, as is necessary where the parts are integral as in Figs. 1 and 2. These brackets are preferably drop forged, and each is provided adjacent the seat for the head of the bolt with the lips 13 adapted to overlap corresponding lips 14 on the stamped metal caps 15 and lock the latter in place. The lips on the cap are so located with relation to each other and with the lips on the seats, that they can be entered onto the seats between the lips on the latter, and then by giving the cap a partial turn, carry the lips on the caps under the lips on the seat and thus lock the caps in place. This locking of the cap to the seats can be made more effective by making the lips of wedge shape, so that a turning movement of the caps in one direction, tends to force the caps down onto the seats. These caps protect the heads of the bolt against incrustation.

In my Patent No. 909,956, I attach the bolts to the roof sheet by means of pads secured by rivets to the inner face of the roof sheet. With such construction the roof sheet must have a hole for each stay bolt, and each pad is secured by a plurality of rivets. By my present construction, I dispense with the holes in the sheet, and the expense of forming and threading same, and by employing a single rivet for each bolt I secure a much higher efficiency of the roof sheet than can be attained with any stay bolt now in use.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. The combination with a bracket having a curved seat and a base flange located at an inclination to the seat, of a bolt having a rounded head the latter being mounted in the seat.

2. The combination with a bracket comprising a base flange, for attachment to the roof sheet of a boiler, a seat for the head of a stay bolt and a web connecting the seat and base flange, of a cap removably secured to the seat for covering and protecting the head of the bolt.

3. The combination with a bracket comprising a base flange for attachment to the roof sheet of a boiler, a seat for the head of a stay bolt and a web connecting the head and the seat, of a removable cap having projecting lips adapted to engage corresponding lips on the seat, the said cap adapted to cover and protect the head of the stay bolt.

4. As a new article of manufacture, a stay bolt attaching bracket comprising a base flange, a seat for the bolt head and a web connecting the seat and flange, the flange being located at an inclination to the web, substantially as and for the purpose specified.

5. As a new article of manufacture a bracket for attaching stay bolts to the roof sheets of boilers comprising a base flange having rivet holes, a web intermediate said rivet holes and seats projecting laterally from the web, the said seats being in line with the rivet holes.

6. As a new article of manufacture a bracket for attaching stay bolts to the roof sheet of a boiler, comprising a base flange having rivet holes, a web intermediate the rivet holes and seats projecting laterally from the web, the said flange, web and seats being integral.

7. As a new article of manufacture a bracket for attaching stay bolts to boilers comprising a base flange having rivet holes, a web intermediate said rivet holes, and two laterally projecting seats the latter having holes for the passage of the stay bolts.

8. The combination with a bracket having a curved seat and a base flange located at an inclination to the seat, of a bolt having a rounded head independent of the shank of a bolt and secured thereto, the said head being mounted in the seat.

9. The combination with a bracket having a curved seat and a base flange located at an inclination to the seat, of a bolt having a rounded head the latter being screwed onto the bolt, the said head being mounted in the seat.

10. A bracket for attaching flexible stay bolts to boilers comprising a base flange and a connected seat for the head of the bolt, the seat being at inclination to the base flange.

In testimony whereof, I have signed this specification in the presence of two subscribing witnesses.

BENJAMIN E. D. STAFFORD.

Witnesses:
EDWIN S. RYCE,
WM. F. McNABB.